(12) United States Patent
Hsu

(10) Patent No.: US 10,710,353 B2
(45) Date of Patent: Jul. 14, 2020

(54) SYSTEMS AND METHODS FOR LASER PREHEATING IN CONNECTION WITH FUSED DEPOSITION MODELING

(71) Applicant: Keng Hsu, Gilbert, AZ (US)

(72) Inventor: Keng Hsu, Gilbert, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 15/262,399

(22) Filed: Sep. 12, 2016

(65) Prior Publication Data

US 2017/0072633 A1    Mar. 16, 2017

Related U.S. Application Data

(60) Provisional application No. 62/217,552, filed on Sep. 11, 2015.

(51) Int. Cl.
| | | |
|---|---|---|
| *B29C 64/118* | (2017.01) | |
| *B33Y 30/00* | (2015.01) | |
| *B33Y 10/00* | (2015.01) | |
| *B33Y 50/02* | (2015.01) | |
| *B29C 35/08* | (2006.01) | |
| *B29C 64/386* | (2017.01) | |

(Continued)

(52) U.S. Cl.
CPC .......... *B33Y 30/00* (2014.12); *B29C 35/0805* (2013.01); *B29C 64/106* (2017.08); *B29C 64/386* (2017.08); *B33Y 10/00* (2014.12); *B33Y 50/02* (2014.12); *B29C 64/118* (2017.08); *B29C 64/282* (2017.08); *B29C 2035/0838* (2013.01)

(58) Field of Classification Search
CPC . B29C 67/0055; B29C 64/386; B29C 64/106; B29C 35/0805; B29C 2035/0838; B33Y 10/00; B33Y 30/00; B33Y 50/02
See application file for complete search history.

(56) References Cited

U.S. PATENT DOCUMENTS

| | | | | |
|---|---|---|---|---|
| 5,303,141 | A | * | 4/1994 | Batchelder .............. B29C 41/36 156/244.11 |
| 7,625,198 | B2 | * | 12/2009 | Lipson .................... A61L 27/36 425/174 |

(Continued)

FOREIGN PATENT DOCUMENTS

| | | |
|---|---|---|
| WO | 01/20534 | 3/2001 |
| WO | 2015/031453 | 3/2015 |

(Continued)

OTHER PUBLICATIONS

Laser Wavelengths, Mar. 4, 2011, University of California, Riverside, p. 1 (Year: 2011).*

(Continued)

*Primary Examiner* — Matthew J Daniels
*Assistant Examiner* — Andrew L Swanson
(74) *Attorney, Agent, or Firm* — Snell & Wilmer L.L.P.

(57) ABSTRACT

Fused deposition modeling (FDM) systems and methods may be improved via laser pre-heating of the target substrate ahead of the extrusion nozzle. Higher interface temperatures lead to improved wetting, diffusion, and randomization, thus improving the bond between filaments and between layers, and reducing anisotropy in the resulting finished part.

15 Claims, 10 Drawing Sheets

(51) Int. Cl.
    B29C 64/106    (2017.01)
    B29C 64/282    (2017.01)

(56) References Cited

U.S. PATENT DOCUMENTS

| | | | | |
|---|---|---|---|---|
| 8,653,409 | B1* | 2/2014 | Sodhi | B23K 26/0081 |
| | | | | 219/121.61 |
| 2002/0129485 | A1* | 9/2002 | Mok | G05B 19/4099 |
| | | | | 29/527.2 |
| 2003/0206820 | A1* | 11/2003 | Keicher | B05B 7/14 |
| | | | | 419/9 |
| 2003/0214571 | A1* | 11/2003 | Ishikawa | B23K 26/0604 |
| | | | | 347/255 |
| 2006/0054039 | A1* | 3/2006 | Kritchman | B29C 41/02 |
| | | | | 101/424.1 |
| 2006/0137775 | A1 | 6/2006 | White | |
| 2014/0210137 | A1 | 7/2014 | Patterson | |
| 2014/0361460 | A1* | 12/2014 | Mark | B29C 70/521 |
| | | | | 264/248 |
| 2015/0061170 | A1* | 3/2015 | Engel | B29C 67/0088 |
| | | | | 264/40.1 |
| 2015/0314528 | A1* | 11/2015 | Gordon | B29C 64/393 |
| | | | | 264/401 |
| 2016/0096236 | A1* | 4/2016 | Cho | G01J 5/0806 |
| | | | | 219/76.12 |
| 2016/0184893 | A1* | 6/2016 | Dave | B33Y 10/00 |
| | | | | 419/53 |
| 2016/0288254 | A1* | 10/2016 | Pettit | B23K 26/0626 |
| 2016/0354977 | A1 | 12/2016 | Gordon | |

FOREIGN PATENT DOCUMENTS

| | | |
|---|---|---|
| WO | 2016/019049 | 2/2016 |
| WO | 2017/035442 | 3/2017 |

OTHER PUBLICATIONS

Guijun Bi, Development and Qualification of a Novel Laser-cladding Head with Integrated Sensors, Jul. 3, 2006, International Journal of Machine Tools and Manufacture, vol. 47 Issues 3-4, p. 555-561 (Year: 2006).*
R. Anitha, et al., "Critical Parameters Influencing the Quality of Prototypes in Fused Deposition Modelling", Journal of Materials Processing Technology, 118(1-3), pp. 385-388, 2001.
T. Nancharaiah, et al., "An Experimental Investigation on Surface Quality and Dimensional Accuracy of FDM Components", International Journal on Emerging Technologies, 1(2), pp. 106-111, 2010.
K. Thrimurthulu, et al., "Optimum Part Deposition Orientation in Fused Deposition Modeling", International Journal of Machine Tools & Manufacture, 44(6), pp. 585-594, 2004.
D. Horvath, et al., "Improvement of Surface Roughness on ABS 400 Polymer Materials Using Design of Experiments (DOE)", Materials Science Forum, vols. 561-565, pp. 2389-2392, 2007.
C. Wang, et al., "Optimizing the Rapid Prototyping Process by Integrating the Taguchi Method with the Gray Relational Analysis", Rapid Prototyping Journal, 3(5), pp. 304-315, 2007.
A. Sood, et al., "Improving Dimensional Accuracy of Fused Deposition Modelling Processed Part Using Grey Taguchi Method", Materials & Design, 30(10), pp. 4243-4252, 2009.
J. Zhang, et al., "Process-Parameter Optimization for Fused Deposition Modeling Based on Taguchi Method", Advanced Materials Research, vols. 538-541, pp. 444-447, 2012.
R. Sahu, et al., "A Study on Dimensional Accuracy of Fused Deposition Modeling (FDM) Processed Parts Using Fuzzy Logic", J Manuf Sci Prod, 13(3), pp. 183-197, 2013.
B. Lee, et al., "Optimization of Rapid Prototyping Parameters for Production of Flexible ABS Object", Journal of Materials Processing Technology, 169(1), pp. 54-61, 2005.
J. Laeng, et al. "Optimizing Flexible Behaviour of Bow Prototype Using Taguchi Approach", Journal of Applied Sciences, 6, pp. 622-630, 2006.
Y. Zhang, et al., "A Parametric Study of Part Distortions in Fused Deposition Modelling Using Three-Dimensional Finite Element Analysis", Proc Inst Mech Eng B, 222(8), pp. 959-968, 2008.
T. Nancharaiah, "Optimization of Process Parameters in FDM Process Using Design of Experiments", International Journal of Emerging Technologies, 2(1), pp. 100-102, 2011.
G. Kumar, et al., "Optimization of Support Material and Build Time in Fused Deposition Modeling (FDM)", Applied Mechanics and Materials, vols. 110-116, pp. 2245-2251, 2012.
S.H. Ahn, et al. "Anisotropic Material Properties of Fused Deposition Modeling ABS", Rapid Prototyping Journal, 8(4), pp. 248-257, 2002.
K. Ang, et al., "Investigation of the Mechanical Properties and Porosity Relationships in Fused Deposition Modelling-Fabricated Porous Structures", Rapid Prototyping Journal,12(2), pp. 100-105, 2006.
A. Sood, et al., "Parametric Appraisal of Mechanical Property of Fused Deposition Modelling Processed Parts", Materials & Design, 31(1), pp. 287-295, 2010.
G. Percoco, et al., "Compressive Properties of FDM Rapid Prototypes Treated with a Low Cost Chemical Finishing", Research Journal of Applied Sciences, Engineering and Technology, 4(19), pp. 3838-3842, 2012.
F. Rayegani, et al., "Fused Deposition Modelling (FDM) Process Parameter Prediction and Optimization Using Group Method for Data Handling (GMDH) and Differential Evolution (DE)", Int J Adv Manuf Technol, 73(1-4), pp. 509-519, 2014.
S. Masood, et al., "Tensile Properties of Processed Fdm Polycarbonate Material", Materials Science Forum, vols. 654-656, pp. 2556-2559, 2010.
J. Rodriguez, et al., "Mechanical Behavior of Acrylonitrile Butadiene Styrene (ABS) Fused Deposition Materials. Experimental Investigation", Rapid Prototyping Journal, vol. 7, No. 3, pp. 148-158, 2001.
Y. Yan, et al., "Research on the Bonding of Material Paths in Melted Extrusion Modeling", Materials & Design, 21, pp. 93-99, 2000.
S. Partain, "Fused Deposition Modeling with Localized Pre-Deposition Heating Using Forced Air", Master of Science in Mechanical Engineering Thesis, Montana State University, 2007.
P. De Gennes, "Reptation of a Polymer Chain in the Presence of Fixed Obstacles", The Journal of Chemical Physics, vol. 55, No. 1, pp. 572-579, 1971.
R. Wool, et al., "Welding of Polymer Interfaces", Polymer Engineering Science, vol. 29, No. 19, pp. 1340-1367, 1989.
A. Ravi, et al. "An In-Process Laser Localized Pre-Deposition Heating Approach to Inter-Layer Bond Strengthening in Extrusion Based Polymer Additive Manufacturing", Journal of Manufacturing Processes, 24, pp. 179-185, 2016.
A. Ravi, "A Study on an In-Process Laser Localized Pre-Deposition Heating Approach to Reducing FDM Part Anisotropy", Master of Science Thesis, Arizona State University, Aug. 2016.
M. Malinauskas, et al., "3D Microporous Scaffolds Manufactured via Combination of Fused Filament Fabrication and Direct Laser Writing Ablation", Micromachines, 5, pp. 839-858, 2014.

* cited by examiner

SYSTEMS AND METHODS FOR LASER PREHEATING IN CONNECTION WITH FUSED DEPOSITION MODELING

CROSS-REFERENCE TO RELATED APPLICATIONS

This application claims priority to, and the benefit of, U.S. Provisional Application Ser. No. 62/217,552 filed on Sep. 11, 2015 and entitled "SYSTEMS AND METHODS FOR LASER PREHEATING IN CONNECTION WITH FUSED DEPOSITION MODELING". The foregoing application is hereby incorporated by reference in its entirety for all purposes.

TECHNICAL FIELD

The present disclosure relates to additive manufacturing, and particularly to additive manufacturing approaches utilizing laser-based preheating.

BACKGROUND

Currently, additive manufacturing approaches suffer from various drawbacks, for example property anisotropy in parts produced by filament extrusion-based processes; in many approaches, inter-layer strength is often only between about 10% and 50% of the strength in the along-the-filament direction. Accordingly, improved additive manufacturing systems and methods remain desirable.

BRIEF DESCRIPTION OF THE DRAWINGS

With reference to the following description and accompanying drawings.

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the present disclosure.

For the sake of brevity, conventional techniques for additive manufacturing, fused deposition modeling, laser energy generation and/or control, and/or the like may not be described in detail herein. Furthermore, the connecting lines shown in various figures contained herein are intended to represent exemplary functional relationships and/or physical or communicative couplings between various elements. It should be noted that many alternative or additional functional relationships may be present in a practical additive manufacturing system (for example, a Fused Deposition Modeling (FDM) system) utilizing laser heating and related methods of use.

Figure 1:
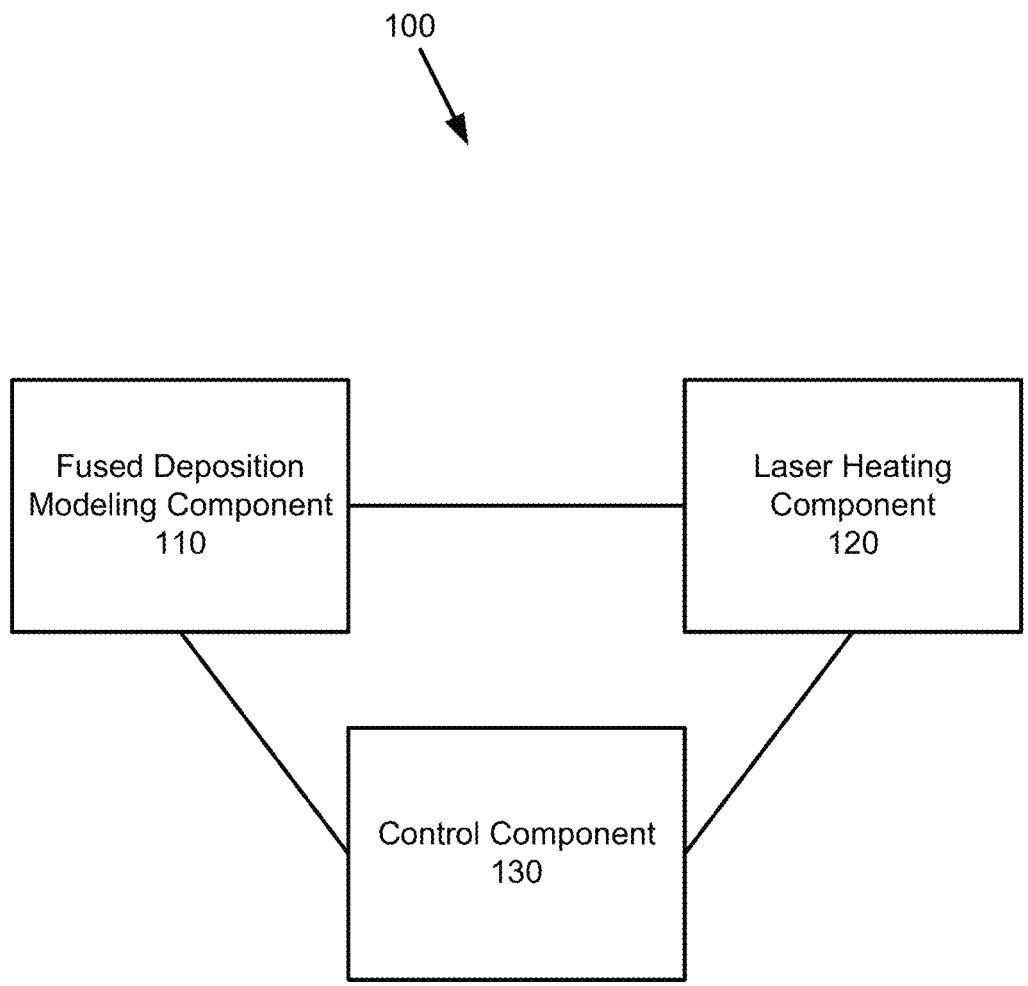
FIG. 1 illustrates an exemplary fused deposition modeling system utilizing laser heating in accordance with an exemplary embodiment.

With reference now to FIG. 1, principles of the present disclosure contemplate additive manufacturing utilizing laser energy, for example laser heating of a target area in connection with fused deposition modeling. In various exemplary embodiments, a focused laser beam is used to locally heat up a part surface during a Fused Deposition Modeling (FDM) three-dimensional printing process to enhance bonding between the filament exiting the FDM nozzle and the target surface. Through the enhancement in inter-filament bonding through this real-time local preheating process, the strength of an FDM part in the across-layer direction can be nearly identical to that in the along-filament directions. As used herein, "laser heating", "laser pre-heating", or similar terms may be used interchangeably to refer to use of a laser to increase the temperature of a substrate prior to deposition of an FDM filament.

Current additive manufacturing processing capability limitations prevent many candidate parts from being economically viable at production volumes and often require extensive secondary post processing to achieve the same characteristics as conventionally produced parts. In the context of FDM technology, one of the issues that has plagued the large-scale adoption of FDM parts in rigorous engineering applications is the property anisotropy in FDM parts. For example, FDM parts typically exhibit low part strength in the direction along which the layers are added. Depending on a number of process parameters, the normal-to-layer direction strength is only 10%-65% of that in the along-the-filament direction. Prior efforts have been made to try to address this, for example by optimization of process parameters, post-fabrication surface treatments, and post-fabrication heat treatments. However, an effective method to increase the layer-to-layer bond strength has not been achieved by prior approaches.

To address these and other shortcomings of prior approaches, principles of the present disclosure contemplate a real-time active laser local heating process where a laser (for example, a laser having a wavelength of between about 750 nanometers and about 1400 nanometers) supplies thermal energy at a tightly focused spot located in front of the leading side of the FDM nozzle as it travels. In various exemplary embodiments, as the polymer extrudate touches the surface of the existing layer, the three stages of wetting, diffusion, and randomization needed to form a strong intermolecular-penetrated bond takes place to a much larger extent as compared to deposition processes without local pre-heating. Important physical principles of these disclosed enhancements to the FDM process lies in the thermally activated and thermally driven intermolecular penetration process (diffusion and randomization) that only takes place adequately when an amorphous polymer is heated to above its glass transition temperature (Tg). Unlike the common build envelope heating method, where the highest temperature used is around 50% of a typical polymer Tg to prevent dimensional and geometrical issues, exemplary laser-based local pre-heating systems and methods provide targeted and localized pre-heating of a desired bond site above its Tg without a negative impact on the part dimension and geometry.

As compared to prior approaches, exemplary systems and processes can bring the temperature of the bonding site to very high temperatures. The heat is confined to an extremely small volume. This allows for drastic increases in bond strength without affecting part structural integrity and tolerances during the building process. Moreover, exemplary laser heating processes disclosed herein may be fully integrated with existing FDM approaches and can be switched on and off, as desired, without effecting the intrinsic FDM process.

With reference now to FIG. 1, in an exemplary embodiment an FDM system 100 with laser preheating comprises an FDM component 110, a laser heating component 120, and a control component 130. FDM component 110 is configured to provide fused deposition modeling capabilities. Laser heating component 120 is configured to couple to and/or integrate with FDM component 110 in order to provide localized heating ahead of a nozzle of FDM component 110. Control component 130 is configured to govern and/or control the operation of FDM component 110 and laser heating component 120, and/or to interface with external systems and controllers.

Figure 2A:
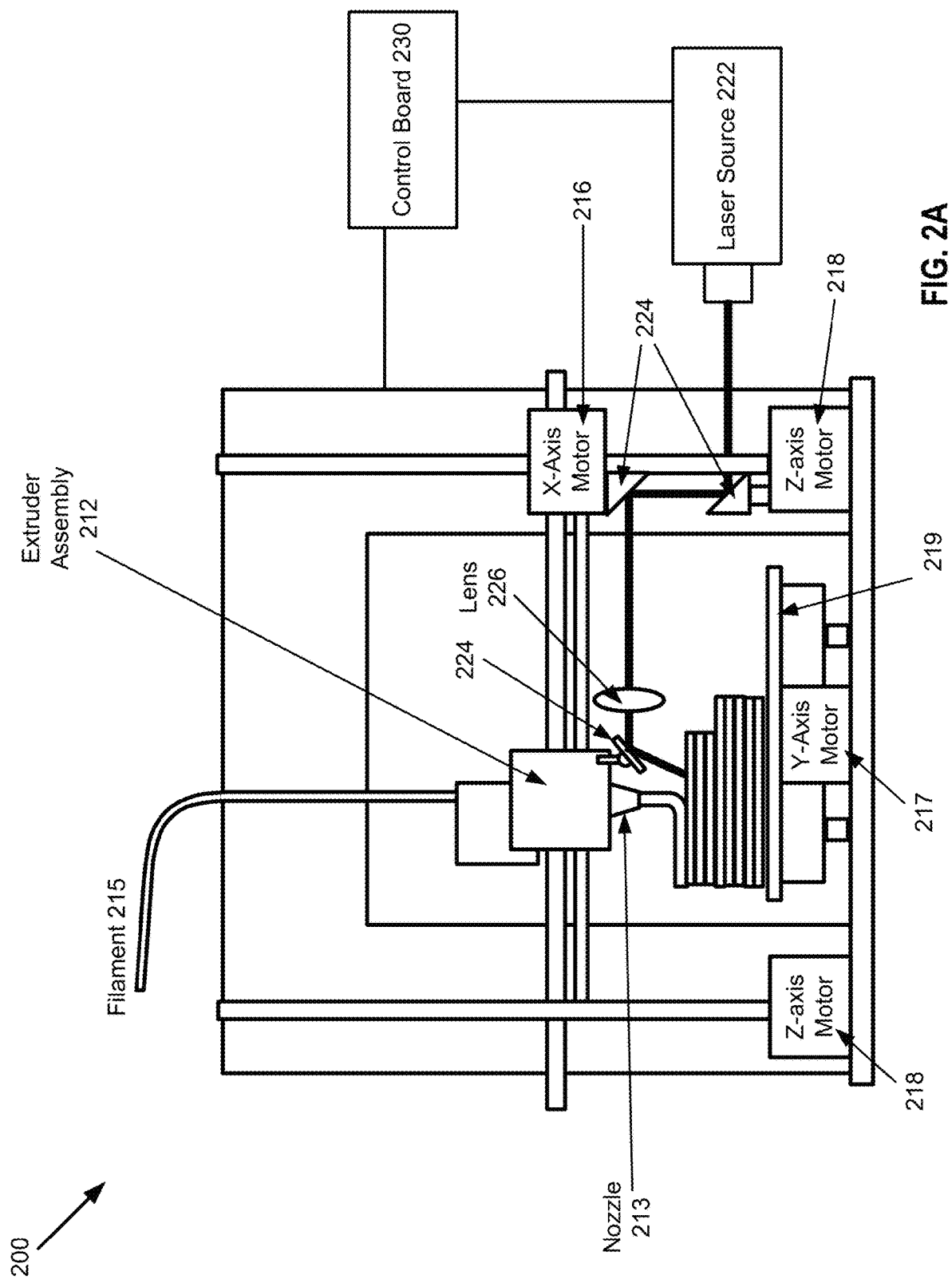
FIG. 2A illustrates an exemplary fused deposition modeling system utilizing laser heating in accordance with an exemplary embodiment.

With reference now to FIG. 2A, in an exemplary embodiment an FDM system 100, for example FDM system 200, comprises an extruder assembly 212 having a nozzle 213 for deposition of a filament 215, an x-axis motor 216, a y-axis motor 217, at least one z-axis motor 218, a laser source 222, at least one guide mirror 224, and a focusing lens 226. FDM system 200 may also comprise a build plate 219 for use in depositing 3-D printed objects thereon; build plate 219 may be fixed in place or may be translatable and/or rotatable in the x, y, and z dimensions. Additionally, FDM system 200 may utilize a control board 230.

In some exemplary embodiments, FDM system 200 may utilize multiple laser sources 222. Laser sources 222 may be identical, or may differ from one another (for example, in intensity, wavelength, etc.). Laser sources 222 may share a common optical path, or different optical paths. In this manner, a single FDM system 200 may be configured for use with various materials, via operation of different laser sources 222. Moreover, in some embodiments multiple laser sources 222 may be simultaneously operative in FDM system 200, for example in order to characterize process temperatures, achieve a desired level of heating in a target area ahead of nozzle 213 while minimizing ablation of the target area, and/or the like.

Extruder assembly 212 may comprise any suitable FDM extruder as is known in the art. In certain exemplary embodiments, FDM system 200 may utilize multiple extruder assemblies 212, for example in order to enable deposition of multiple filaments 215 (which may be the same, or different materials). In this manner, FDM-printed parts having desired characteristics or combinations of characteristics may be formed; moreover, certain portions of a part may be formed primarily (or exclusively) from a first filament 215, while other portions of the part may be formed primarily (or exclusively) from a second filament 215, in order to achieve a desired strength, weight, tolerance, thermal performance, or other characteristics of different portions of the FDM-printed part. In various exemplary embodiments, filament 215 may comprise a suitable thermopolymer, for example one or more of nylon, polylactic acid (PLA), acrylonitrile butadiene styrene (ABS), ABSi, polyphenylsulfone (PPSF), polycarbonate (PC), polyetherimide, and/or the like.

Control board 230 may comprise any suitable electronic components, for example microprocessors, resistors, capacitors, inductors, transistors, diodes, light-emitting diodes, switches, traces, jumpers, fuses, amplifiers, antennas, and so forth, in order to control operation of FDM system 200. In some exemplary embodiments, FDM system 200 is controllable via a link to a software program operative on a personal computer.

In some exemplary embodiments, FDM system 200 utilizes an X-axis motor 216, a y-axis motor 217, and a z-axis motor 218. These motors may be operable to position and/or relocate components of FDM system 200, for example extruder assembly 212, nozzle 213, and/or build plate 219, as desired. However, any suitable components or systems for translation, rotation, and/or other movement of relevant portions of FDM system 200 are considered to be within the scope of the present disclosure.

In various exemplary embodiments, laser source 222 (for example a near-IR laser having a wavelength of between about 750 and about 850 nanometers) is focused down to a sub-millimeter spot size and directed (for example, using one or more mirrors 224) to a spot of illumination on an FDM part surface (for example, about 1 mm to about 2 mm away from nozzle 213 on the leading side of nozzle 213). The intensity of the laser generated by laser source 222 is precisely tuned and coupled with the other process parameters of the FDM process such that the polymer surface at the spot where the laser illuminates can be rapidly raised to above its critical temperature (i.e., softening or glass transition temperature depending on the structure of the polymer).

This temperature increase allows for the interface between the exiting filament 215 from nozzle 213 and the surface it is deposited on to be maintained at a temperature above the polymers critical temperature for a controlled amount of time. Therefore, operation of FDM system 200 allows the three stages of a molecular healing process: (i) wetting; (ii) diffusion; and (iii) randomization, to take place. These three stages of molecular healing as facilitated by FDM system 200 allow for reduction of (and/or disappearance of) the "interface" between the deposited filament 215 and the polymer surface, significantly increasing the strength of the interface.

In an exemplary embodiment utilizing FDM system 200, pre-deposition heating or localized heating is utilized to introduce crosslinks between polymer chains in a three-fold process involving melting, diffusion and randomization. In this embodiment, laser source 222 comprises a 2-watt laser with an intensity attenuator, in order to control the amount of heating on the part surface. Additionally, an existing FDM machine may be outfitted with a temperature monitoring system for real time laser source 222 power control, and a thermal history of the FDM part can be obtained, for example through modeling or recording.

In various exemplary embodiments, laser source 222 may be operated continuously. In other exemplary embodiments, laser source 222 may be pulsed, modulated, and/or otherwise tuned or controlled (for example, responsive to changes in movement speeds of nozzle 213, based on characteristics of the material comprising filament 215, based on the current location of nozzle 213 with respect to a part under construction, and/or the like).

In an exemplary embodiment of FDM system 200, a "Lulzbot" brand mini desktop 3-D printer with a 0.5 mm nozzle diameter and black M30 ABS filaments may be utilized. However, any suitable existing or contemplated FDM system may be utilized in connection with principles of the present disclosure. In various exemplary embodiments, the following process inputs are used: a nozzle temperature of 230 degree Celsius, a bed temperature of 110 degree Celsius, 0.3 mm layer thickness, and 1 mm road width. Exemplary extrusion rates may be calculated, for example by suitable slicer software (such as open source software Slic3r) and various print speeds may be used. For infill, rectilinear pattern with 100% fill density or other suitable patterns may be utilized. In some exemplary embodiments, the build orientations are such that when the FDM-created part is subjected to bending, tensile load is born in the part in the across-layer direction on the side of the printed part with laser heating.

Figure 2B:
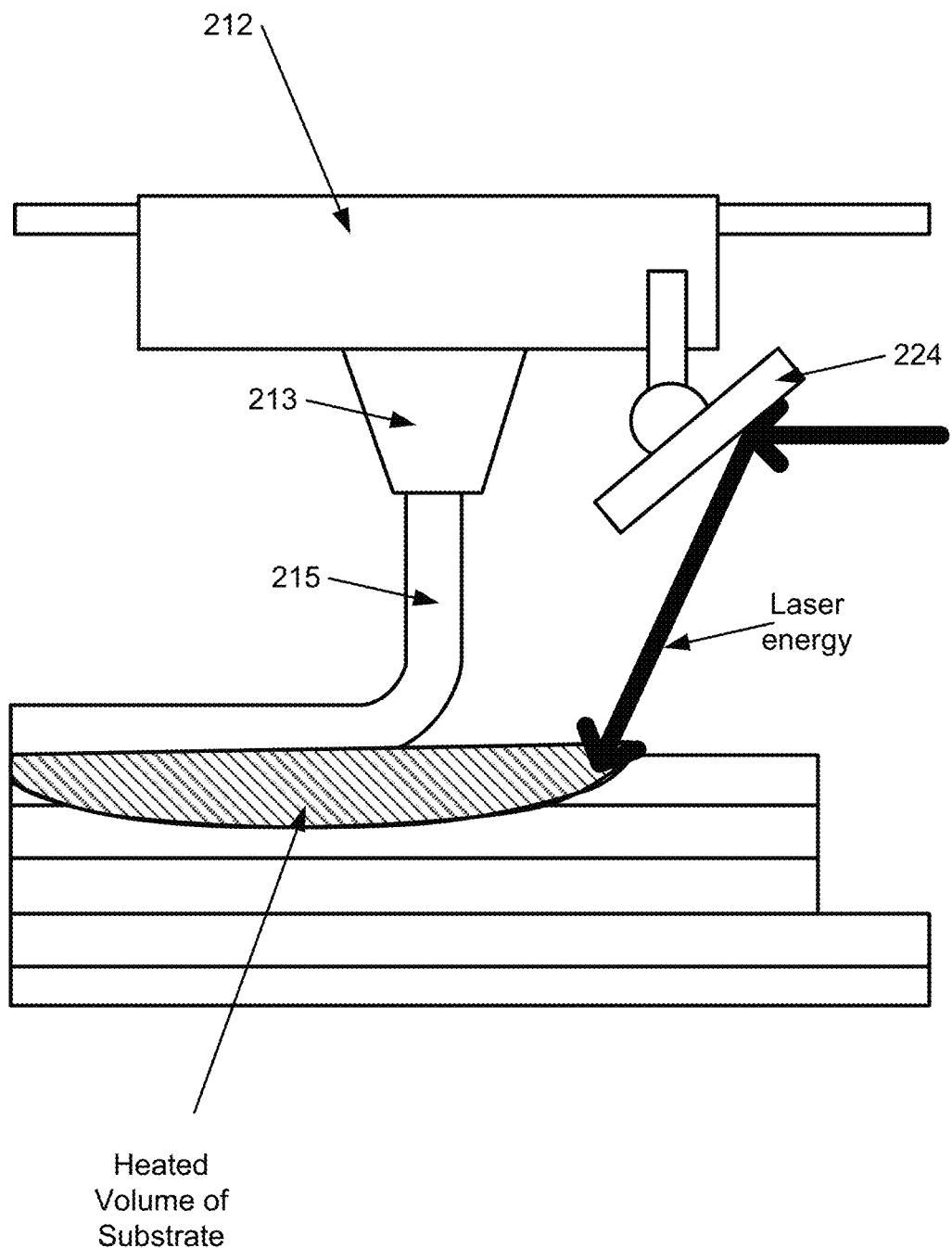
FIG. 2B illustrates operation of an exemplary fused deposition modeling system utilizing laser heating in accordance with an exemplary embodiment.

In an exemplary embodiment, to allow laser illumination on the polymer surface, a custom optical system is integrated into FDM system 200. Two optical mirrors 224 (12 mm dia., 3 mm thick, Gold coated) are mounted on the Z- as well as X-axis such that the laser can be directed from laser source 222 (for example, a 2 W continuous wave diode laser @ 808 nm, 3 mm spot size at aperture) to a spot about 1 mm away from nozzle 213 on the polymer surface at any build height. A focusing lens 226 (for example, Techspec Near IR (NIR) Achromatic Lens, 25 mm Dia.×100 mm) may be used to focus the laser spot down to a desired size, for example around 1 mm in diameter when nozzle 213 is about 0.5 mm away from a surface. A glan polarizer-rotating polarizing prism couple (GL5-B, PRM05 GL5 from Thorlabs) or other suitable components may be utilized as an attenuator for laser intensity adjustment. A schematic of an exemplary implemented system is shown in FIG. 2A, and a close-up illustration of laser energy being deposited into the substrate is shown in FIG. 2B.

Figure 4A:
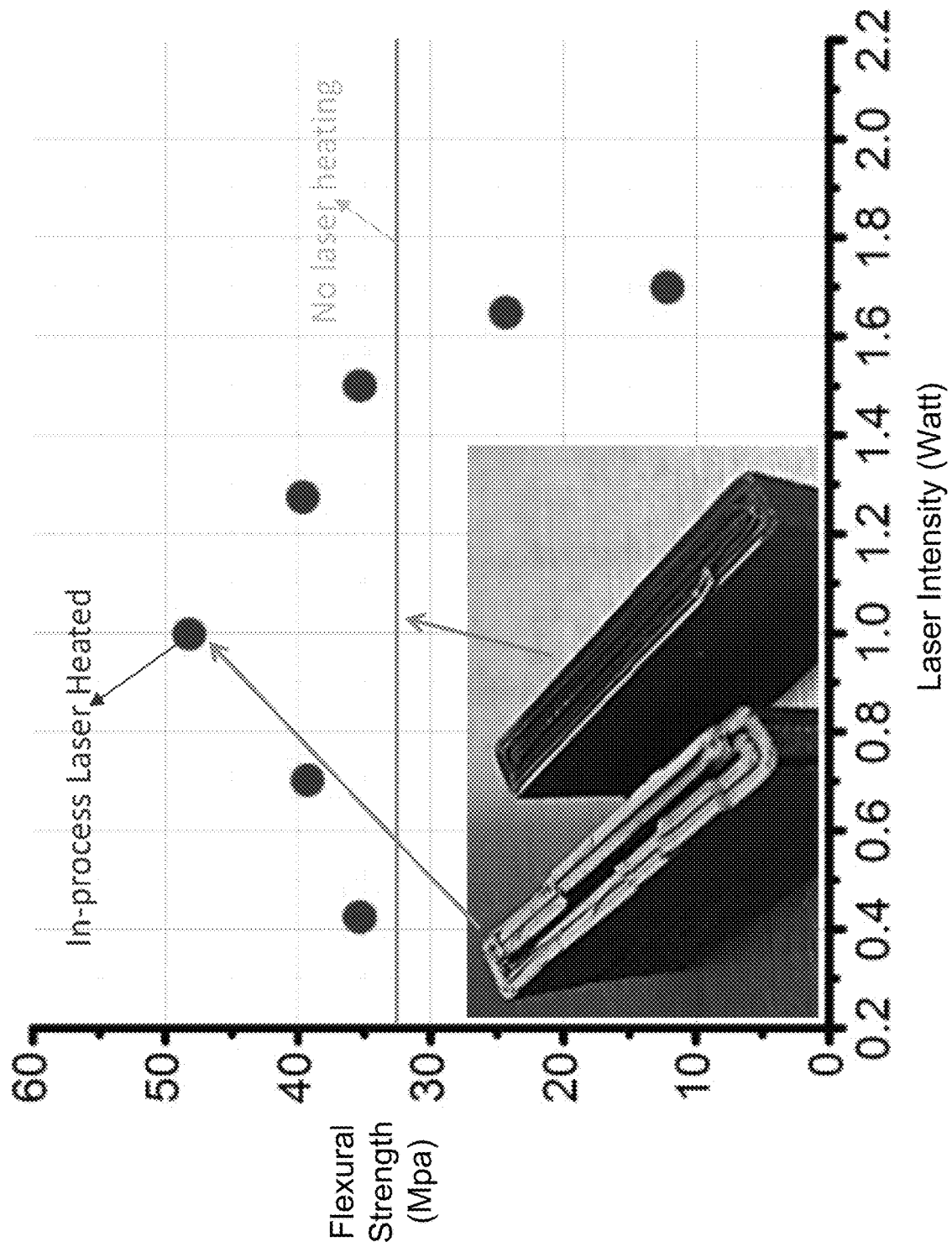
FIGS. 4A through 4F illustrate comparisons between characteristics of parts produced via conventional fused deposition modeling systems and parts produced via operation of an exemplary fused deposition modeling system utilizing laser heating in accordance with an exemplary embodiment.

In accordance with various exemplary embodiments, printed parts may be built based on fixed parameters but with varying speeds for nozzle 213 and varied intensity of laser source 222. In one exemplary embodiment, samples were built for various parameter combinations; bending tests were performed on each, and the loads at bending fracture point of each sample were recorded. Three-point bending tests were used for all printed parts using custom-built tooling fitted to a hydraulic tensile tester. The intensity of laser source 222 was controlled using the rotation of the polarizer-couple attenuator. Shown in FIG. 4A are exemplary results demonstrating clear increase in inter-layer bond strength of about 60% at a particular laser intensity.

In various exemplary embodiments, an optical pathway utilized for laser heating in FDM system 200 may also be utilized for temperature monitoring, measurement, and/or control. For example, the optical path utilized to deliver energy from laser source 222 for heating may also be utilized to monitor/measure the local temperature of a polymer surface as it is being heated. It will be appreciated that other optical pathways may be utilized for temperature monitoring, measurement, and/or control. In this manner, the thermal history of the entire volume of the FDM part can also be recorded. This information can be used to predict the properties of the FDM part. It can also be used as part of a feedback control to monitor and control material property in real time during a build process.

Figure 3:
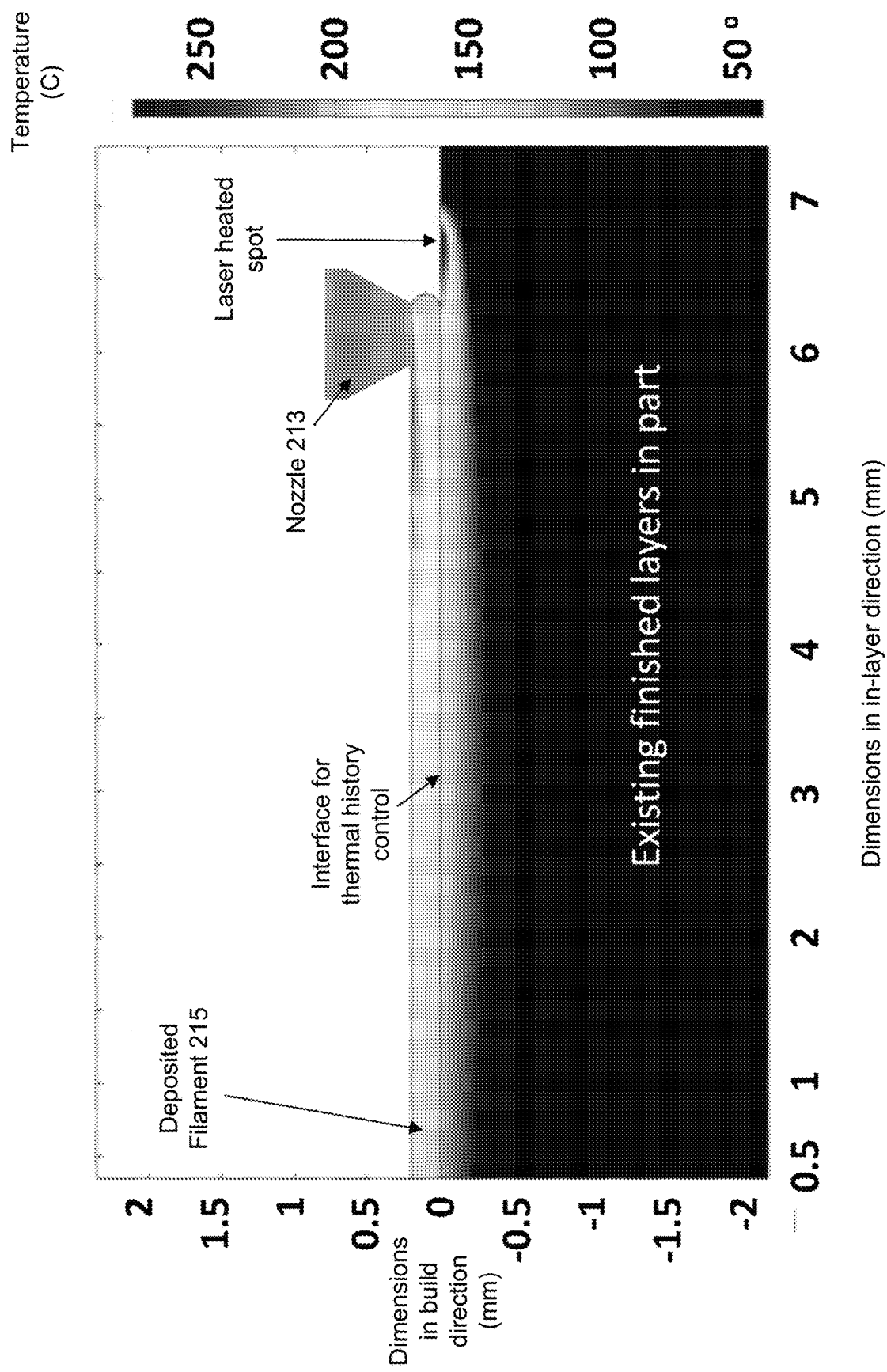
FIG. 3 illustrates thermal characteristics of operation of an exemplary fused deposition modeling system utilizing laser heating in accordance with an exemplary embodiment.

With reference now to FIG. 3, thermal characteristics associated with operation of FDM system 200 are disclosed. As can be seen, thermal energy is deposited, via operation of laser source 222, into a spot on the existing substrate located ahead of nozzle 213. As nozzle 213 advances, depositing filament 215, the interface between filament 215 and the existing substrate is provided with a significantly elevated temperature, facilitating wetting, diffusion, and randomization.

Figure 4B:
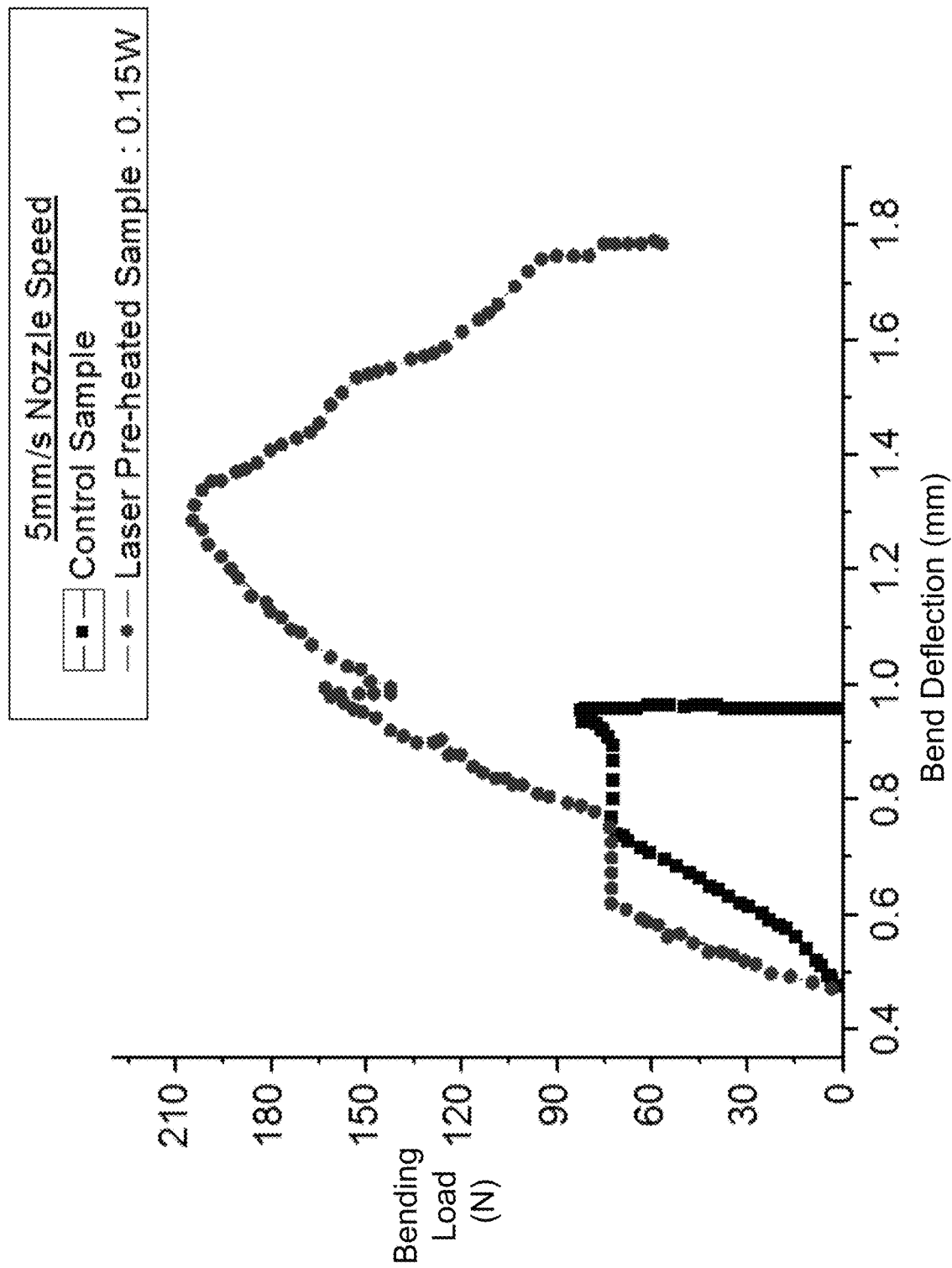
Figure 4C:
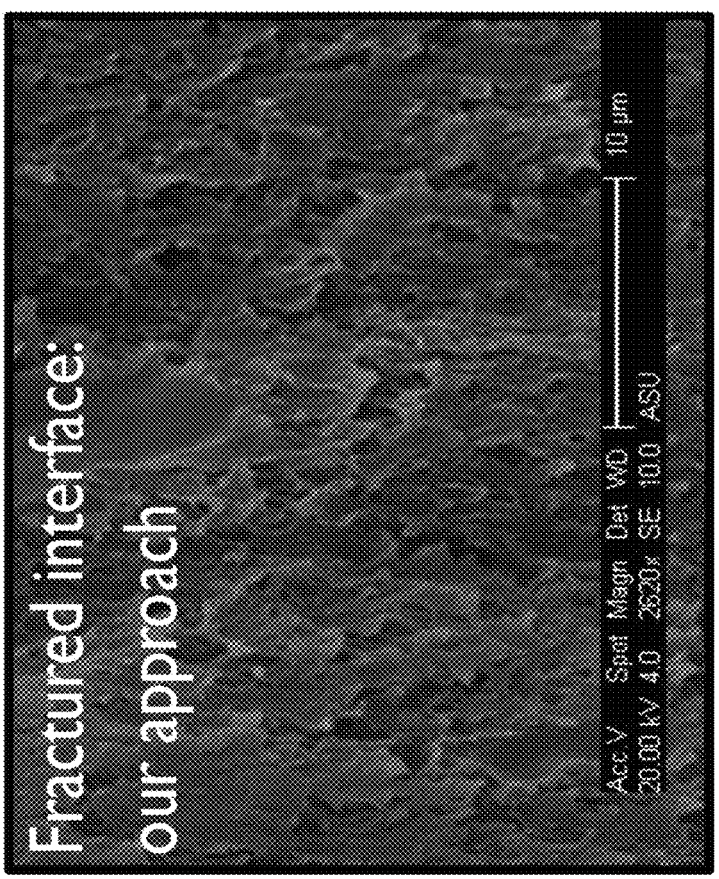
Figure 4C:
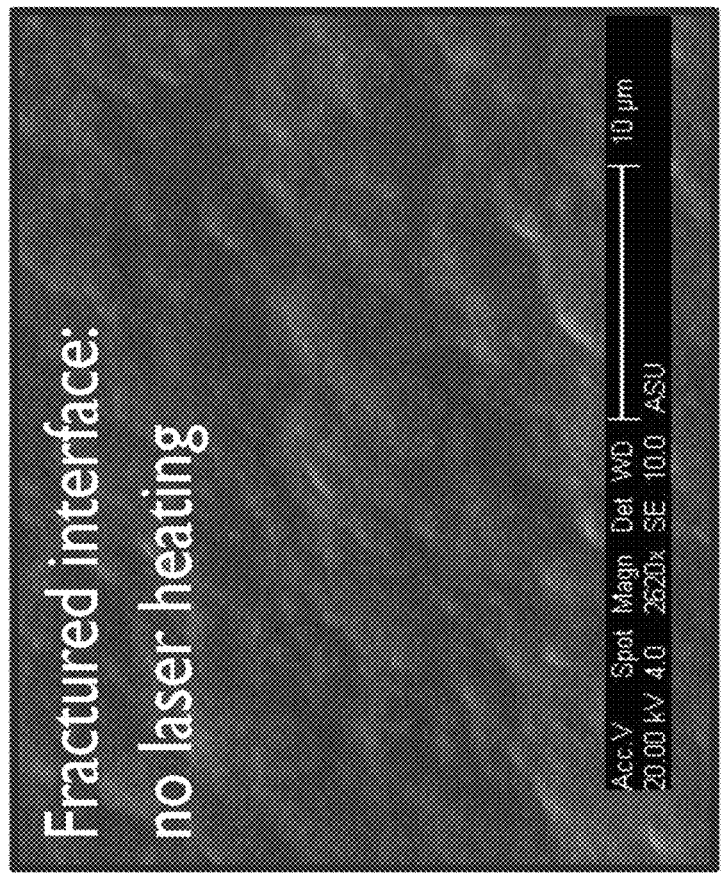

With reference now to FIG. 4B, illustrated are results obtained from three-point bending tests of samples built with intrinsic FDM processes and with an exemplary laser pre-deposition heating approach as exemplified by operation of FDM system 200. Both sets of samples were built at a nozzle speed of 5 mm per second, and the laser preheated samples were created with a pre-deposition laser heating power of 0.15 W. As can be seen, the peak bending load of the localized pre-deposition laser heated sample is more than double when compared to the control sample. When subjected to loading, interlayer separation for the control sample exhibits a brittle fracture behavior, which can be seen by the sharp decrease in bending load for an almost constant deflection value. In contrast, the laser pre-deposition heated sample shows a ductile fracture behavior, characterized by a gradual change in bending load with deflection. The fracture behaviors have been confirmed in Scanning Electron Micrograph (SEM) images of the interlayer fracture regions, which are shown in FIG. 4C. A close observation of the interlayer interface where the fracture occurred shows the differences in morphology, with the laser pre-deposition heated sample displaying a rougher surface. This is attributed to the plastic-deformation of the layers adjacent to the interlayer interface through which the crack propagation occurred during the 3-point bending test. It has also been observed that under certain conditions, the crack has propagated across multiple build layers, which shows the extent of the volume affected by the pre-deposition heating technique disclosed herein. As a consequence, the observed area under the bending load versus deflection curve is much larger for the sample with an exemplary laser heating process implemented, and this area has been quantified by a "toughness factor".

Figure 4D:
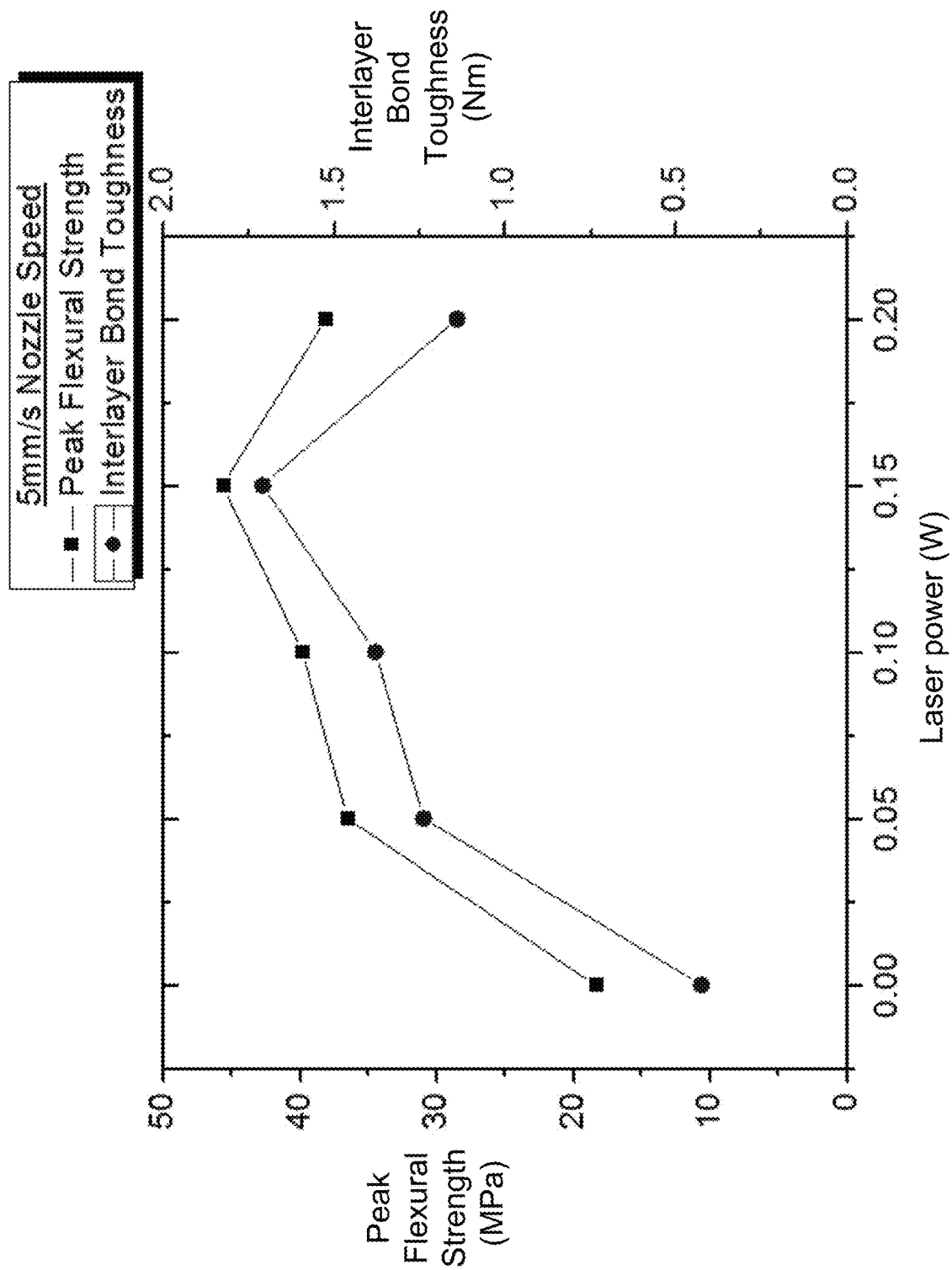

The "toughness factor" is essentially a quantity or measure that characterizes how much bending load and corresponding layer deformation is required to separate two layers. It may be calculated by summing the trapezoidal area under the bending load and deflection curve. This quantity was determined and compared for samples built with a nozzle speed of 5 mm/s and for a range of pre-deposition laser heating powers. A gradual increase in the energy received at the layer surface is expected as the laser power is increased. This produces higher interlayer interface temperatures leading to greater diffusion of polymer chains along the build direction. Shown in FIG. 4D are peak flexural stress values of samples recorded during a 3-point bending test, as well as the toughness of the interlayer bond, plotted against a range of laser heating powers. It is observed that both quantities follow an upward trend until laser power reaches 0.15 watts. Moreover, the interlayer bond toughness values merit examination. As can be seen, the demonstrated values show that the existence of the physical interlayer interface can be reduced with an increase in interlayer interface temperatures. Accordingly, via application of principles of the present disclosure, FDM-produced parts may achieve properties in the build direction that more closely resemble bulk properties of the material in question.

Figure 4E:
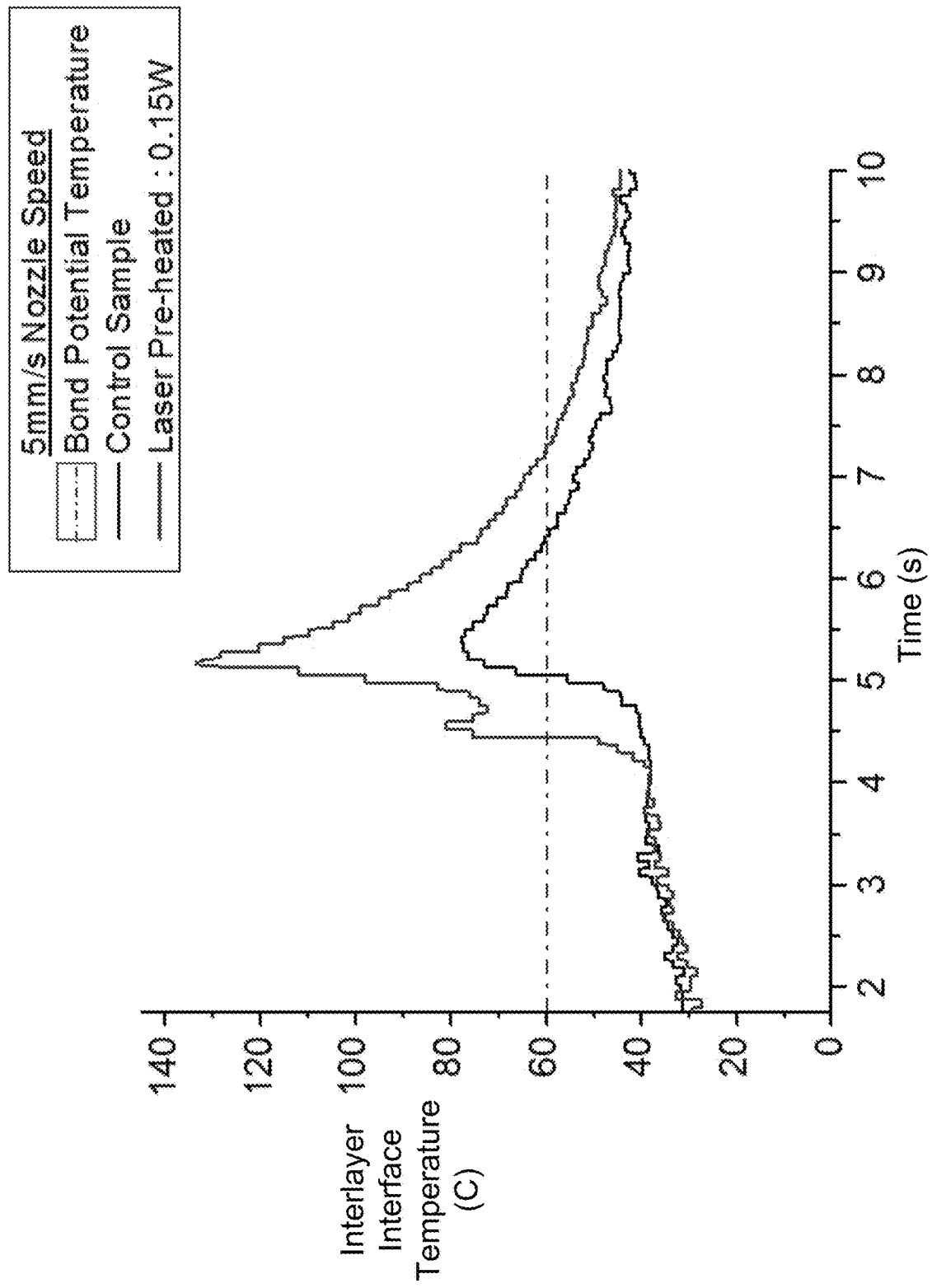

With reference now to FIG. 4E, illustrated are results for exemplary interlayer interface temperature measurement data obtained with an embedded K-type thermocouple. The lower curve (control sample) represents the interface temperature data obtained from the intrinsic FDM process measurements. The peak temperature recorded at the interface was about 77° C., which takes place at the point when the new extrudate is deposited onto the deposition surface. While the temperature recorded was below the glass transition temperature for the material in question, some bonding still takes place between layers for the control sample. Transitioning to an assessment of the laser heated sample (the upper curve), two peaks can be seen. The first peak corresponds to the laser beam spot passing over the thermocouple junction, while the second peak occurs when the extrudate is deposited onto the pre-heated surface. The pre-deposition surface was heated to around 82° C. and the interlayer interface temperature rose to about 135° C. This interface temperature is much higher than that of the control sample; additionally, it remains above glass transition for a relatively longer period of time. When compared to the control sample, it is evident that pre-deposition surface heating using the laser beam spot produces higher surface temperatures and higher interlayer interface temperatures.

To present the influence of interface temperature over interlayer bond strength, a "thermal bonding potential" term is utilized herein. This term quantifies the capacity of the thermal energy required to increase polymer chain diffusion across the interlayer interface, leading to a stronger interlayer bond. A greater "thermal bonding potential" reflects greater interlayer bond strength. A bond potential temperature of 60° C. is utilized in FIG. 4E as a base of reference, and the thermal bond potential for each sample is calculated by summing the trapezoidal area under the interlayer temperature versus time graphs. This was performed for a constant nozzle velocity of 5 mm/s over a range of pre-deposition laser heating powers. By obtaining these values, a relation can be drawn between interlayer bond toughness and the thermal bonding potential.

Figure 4F:
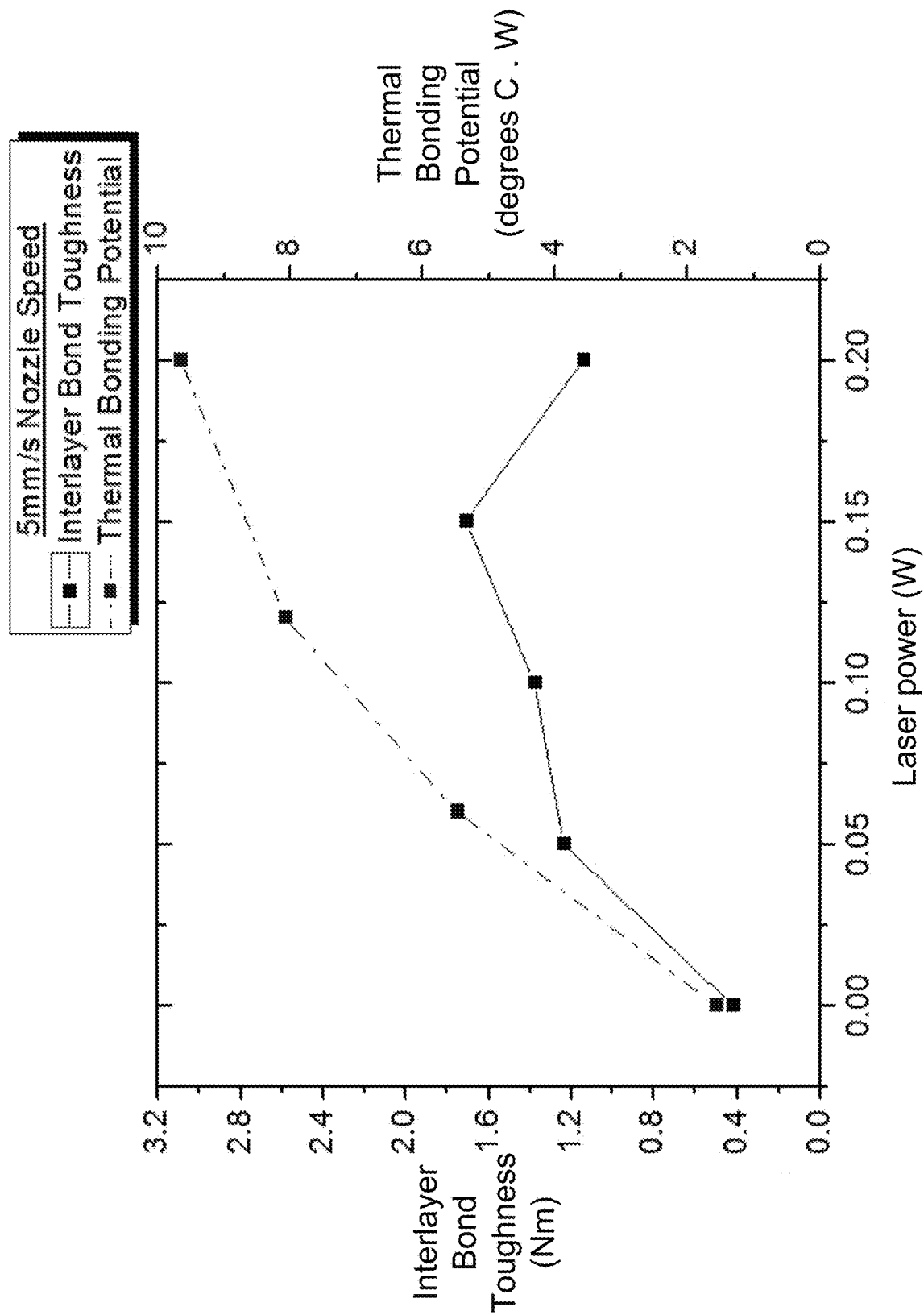

Shown in FIG. 4F is a double y-axes graphical representation of exemplary interlayer bond toughness and thermal bond potential values plotted against a range of powers of the laser beam from laser source 222. The control sample displays the smallest interlayer bond toughness value, consistent with the fact that it has the smallest thermal bonding potential. With the introduction of pre-deposition laser heating in accordance with principles of the present disclosure, a steady rise in interlayer bond toughness occurs as well as the corresponding thermal bonding potential values. A larger area under the temperature-time graph contributes to greater polymer chain diffusion between the layers. However, it is important to note that, under these conditions, if the laser power is elevated to 0.2 watts, a drop in interlayer bonding toughness is seen, even though the thermal bonding potential is the highest! This is because, at high temperatures, evaporation of material from the target surface is observed, which causes defects to be formed on the pre-deposition surface; this leads to voids between the deposition surface and the extruded filament 215.

Via use of exemplary systems and methods disclosed herein, FDM processes may be significantly improved. Bonding between filaments and between layers is increased. Voids between filaments and between layers are decreased. Anisotropy of an FDM-created part may be significantly reduced.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. When language similar to "at least one of A, B, or C" or "at least one of A, B, and C" is used in the claims or specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method for additive manufacturing, the method comprising:
    heating, via a first laser, a first target area on a part under construction via a fused deposition modeling (FDM) machine;
    heating, via a second laser having a wavelength different than the first laser, the first target area at the same time the first target area is heated by the first laser;
    extruding, from a first nozzle of the FDM machine, a first polymer onto the first target area;
    controlling, via an electronic control unit, an applied power of the first laser, an applied power of the second laser, and an extrusion rate of the first nozzle to achieve a desired characteristic in the part under construction;
    monitoring, via a temperature sensing apparatus and along an optical path coaxial with the first laser, thermal information for the part under construction, wherein the thermal information consists of the local temperature of the first target area as it is being heated; and
    recording, via the electronic control unit, the thermal information to create a thermal history of the entire volume of the part under construction,
    wherein the first target area is heated, by the first laser and the second laser and prior to the extruding the first polymer onto the first target area, to a temperature above the glass transition temperature of the first polymer.

2. The method of claim 1, wherein the heating, via the first laser and the second laser, of the first target area causes improved wetting, diffusion, and randomization of the extruded first polymer with respect to the first target area.

3. The method of claim 1, wherein the first laser delivers an applied power of between 100 milliwatts and 200 milliwatts to the first target area.

4. The method of claim 1, wherein the first nozzle of the FDM machine extrudes the first polymer at a rate between 4 mm per second and 6 mm per second.

5. The method of claim 1, wherein the first laser is focused onto the first target area via a lens.

6. The method of claim 1, wherein the desired characteristic is strength in the build direction compared to strength in the extruded polymer direction.

7. The method of claim 1, wherein the center of the first target area is between 1 mm and 2 mm ahead of the first nozzle.

8. The method of claim 1, wherein the first nozzle moves as the first polymer is extruded, and wherein the first target area moves as the first nozzle moves, such that the first polymer is deposited onto the part under construction in a series of roads.

9. The method of claim 8, further comprising forming the part under construction via the movement of the first nozzle, the part comprising a series of layers, and each layer comprising a series of roads.

10. The method of claim 9, wherein the first target area is located on one previously deposited road in a previously deposited layer of the part under construction.

11. The method of claim 1, wherein the heating, via the first laser and the second laser, of the first target area does not ablate the first target area.

12. The method of claim 1, wherein the first laser is configured with a wavelength of between about 700 nm and about 900 nm.

13. The method of claim 1, further comprising:
heating, via a third laser, a second target area on the part under construction;
heating, via a fourth laser having a wavelength different than the third laser, the second target area at the same time the second target area is heated by the third laser; and
extruding, from a second nozzle of the FDM machine, a second polymer onto the second target area,
wherein the second target area is heated, by the third laser and the fourth laser and prior to the extruding the second polymer onto the second target area, to a temperature above the glass transition temperature of the second polymer, and
wherein the first polymer and the second polymer are different.

14. The method of claim 13, wherein the part comprises a series of layers and each layer comprises a series of roads, and wherein the first target area and the second target area are in a common layer.

15. The method of claim 13, wherein the part comprises a series of layers and each layer comprises a series of roads, and wherein the first target area and the second target area are in different layers.

* * * * *